June 17, 1941.  R. R. POYNTER  2,245,821
LAWN MOWER
Filed Nov. 7, 1940    2 Sheets-Sheet 1

Inventor
RALPH R. POYNTER
By Ben Cohen, Attorney

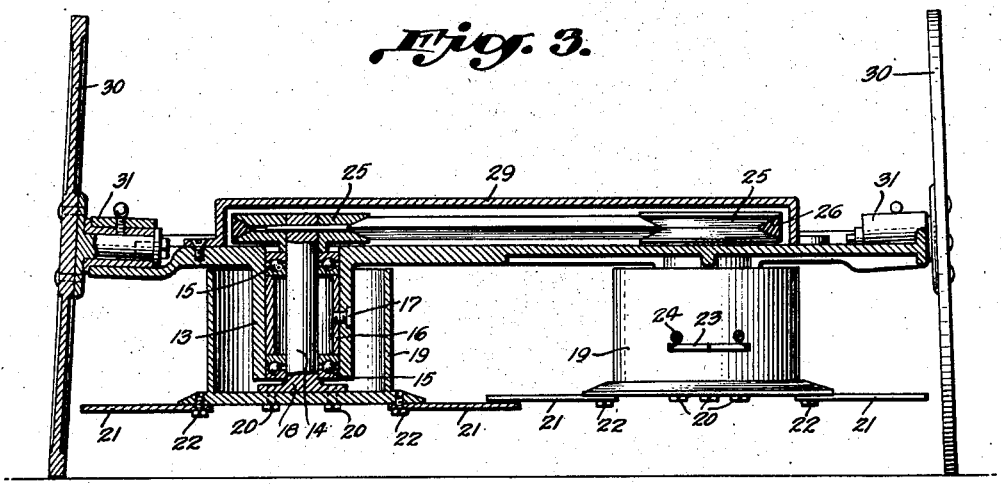
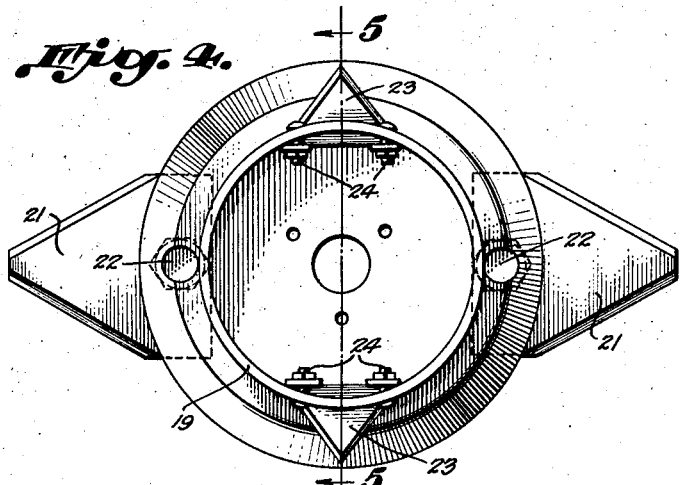
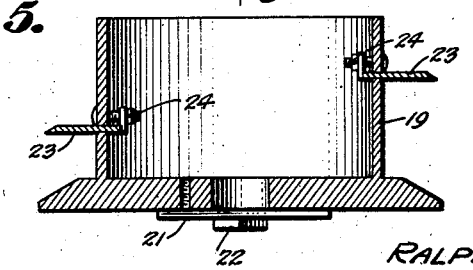
Inventor
RALPH R. POYNTER

Patented June 17, 1941

2,245,821

UNITED STATES PATENT OFFICE 2,245,821

LAWN MOWER

Ralph Reese Poynter, Lebanon, Ind.

Application November 7, 1940, Serial No. 364,719

14 Claims. (Cl. 56—25.4)

This invention relates to new and useful improvements in mowers of the type employing horizontally rotatable cutters.

It has been recognized that ordinary lawn mowers of the reel type are ineffective for the cutting of tall tough grass and weeds because of the difficulty of drawing the grass between the blades of the reel and the ledger plate. Efforts have been made to overcome this difficulty by providing auxiliary cutter attachments for the conventional mower, the cutter attachments having horizontally rotatable cutters, or constructing a lawn mower wherein the sole cutting means comprises horizontally rotatable cutters.

Lawn mowers or attachments for lawn mowers employing horizontally rotatable cutters must, of a necessity, employ vertical shafts for rotating the cutters. In cutting tall tough grass with this type of cutter, there is a tendency for the cut grass to wrap around the vertical shaft and thereby impairing the efficiency of the mower.

Thus, a primary object of the present invention is to provide a lawn mower capable of cutting tall tough grass or weeds without impairing the efficiency of the mower.

A further object of the present invention is the provision of a mower having the cutting members so arranged that they are capable of cleanly cutting or trimming grass along curbs, sides of buildings, tombstones and like stationary objects without damage to the cutters while permitting a close trimming operation.

A still further object of the present invention is the provision of a lawn mower which is relatively simple in construction, highly efficient in operation, and which is capable of operation with minimum effort on the part of the operator.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a vertical cross-sectional view taken on the line 3—3 of Figure 1.

Figure 4 is a top plan view of one of the cutter blade assemblies.

Figure 5 is a sectional view taken on the line 5—5 of Figure 4.

Figure 1:
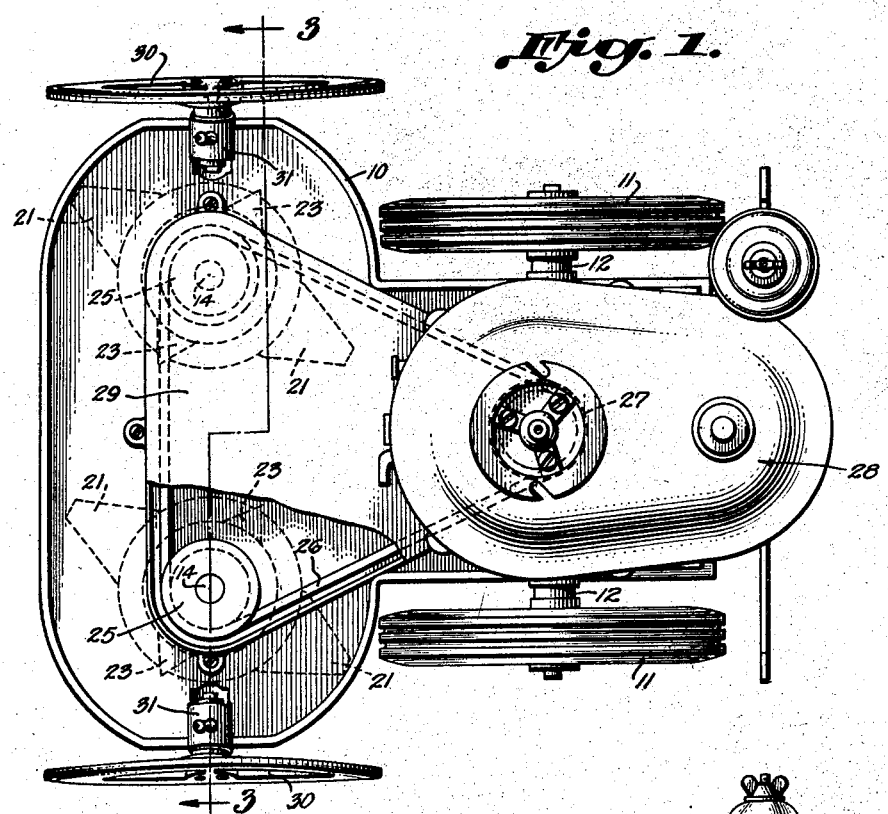
Figure 1 is a top plan view of the mower.
Figure 2:
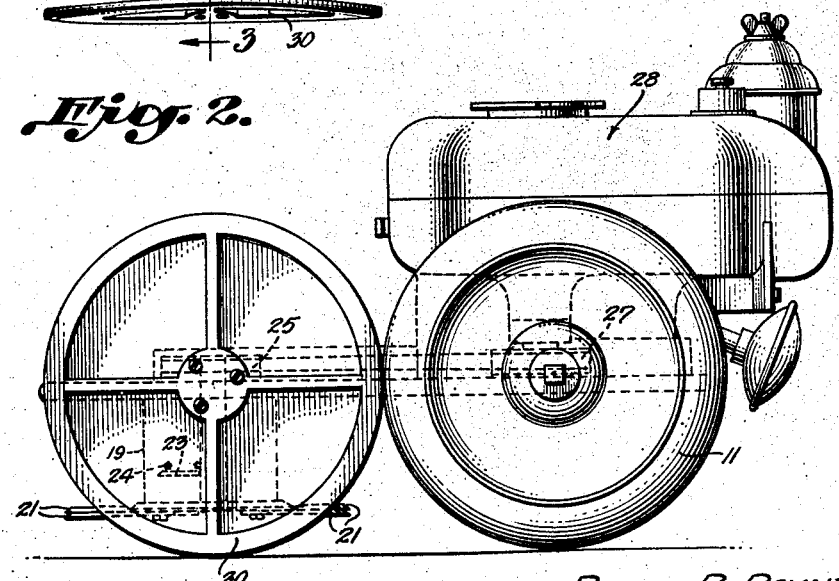
Figure 2 is a side elevational view of the same.

Referring to the drawings, the improvements forming the subject matter of the present invention are shown applied to a power driven lawn mower of the rotating blade type. The mower may be of any suitable construction, the one shown in the drawings having a supporting frame 10, provided with a pair of spaced traction wheels 11 mounted upon an axle 12 supported on the frame 10. The wheels 11 may be of any desired type, but are preferably pneumatic or are provided with solid rubber treads.

Mounted at the forward end of the frame are a pair of housings 13. The housings are shown as being integrally formed with the frame but may be separate members permanently or detachably secured to the frame. Received within these housings are the vertical shaft members 14. Each of the shafts 14 is mounted in antifriction bearings indicated by the numeral 15, separated by a spacing sleeve 16 which is secured to the housing 13 by a set screw 17. The anti-friction bearings are preferably ball bearings and serve to take the end thrust of the shaft in opposite directions.

The lower end of each of the shafts terminates in a flat disc-like portion 18 to which the blade carrying housing 19 is detachably secured by means of bolts 20. The cutting blades 21 are mounted on the lower surface of the housing or casing 19 and rotate in a horizontal plane, said rotation resulting from the rotation of the vertical shaft upon which the casing is mounted. The cutter blades are detachably mounted by means of the threaded bolts 22 to enable same to be removed for sharpening or other purposes.

Also mounted on each side wall of the housing at opposite sides thereof are a pair of cutting blades 23. These blades are detachably secured to the housing by means of bolts 24. The cutter blades 23 are smaller than the cutter blades 21 and on each housing the blades 23 are in different horizontal planes.

For driving the cutter blades, each of the shafts 14 has a pulley 25 at its upper end driven by a belt 26 operatively engaged therewith as well as with a similar pulley 27 mounted on the gasolene motor, generally indicated by the numeral 28. The motor 28 is mounted at the rear of the frame 10 above the wheels 11. A cover plate 29, detachably secured to frame 10 protects the pulleys 25 and belt 26.

A pair of wheels 30 are suitably journalled to the forward end of frame 10 by means of shaft journals, generally indicated by the numeral 31. As is clearly illustrated in Figure 3, the front wheels 30 are relatively thin and the ends of the cutters 21, when in transverse position, extend to a point closely adjacent the inner surface of the wheels. As a result of this construction, the cutter blades will cut a strip of grass almost equal to the full width of the mower.

As is clearly illustrated in Figures 1 and 3, both ends of the front axle are bent upwardly approximately one eighth of an inch from the horizontal thereby resulting in a slight tilting of the front wheels. The wheels tilt inwardly at the top approximately five degrees from the vertical and measure approximately one inch closer from tip to tip at the top than at the bottom of the wheels.

Numerous advantages follow as a result of the novel construction and arrangement of the cutter blades and the tilted wheels. The tilting of the front wheels permits mowing close to stones, curbs and similar objects with minimum effort as the whole side of the front wheels will not drag against any vertical object when mowing against it. The tilting of the front wheels will also allow mowing around tomb stones with bases extending or bulging out past the grass line, as the mower will mow under the bulging portion. On water levees, fish hatchery terraces etc., the mower will not skid. In other words, the presence of the tilted wheels will permit the mower to mow any type of steep incline without skidding.

The front wheels 31 serve the further functions of protecting the cutter blades from striking against stationary objects and supporting the forward part of the frame to keep the cutter blades 21 spaced the desired distance above the ground.

It will be apparent that the power driven lawn mower is operated in the usual way for driving the rotating cutter blades 21. The blades should be driven at relatively high speed but this may be controlled by the operator. As the machine moves forward in its normal cutting operation, the cutters 21 operating at high speed will effectively sever any tall grass or weeds in their path. It is further apparent that cutter blades 23, mounted on the casing carrying the cutter blades 21, will also rotate at the same speed as the cutter blades 21. The blades 23, being shorter than the blades 21, will not come into contact with the uncut grass but functions to prevent any of the cut grass from wrapping around the casing 19 and working up into the operating parts of the shaft assembly, and accomplishes this function by chopping or further cutting the tall cut grass into small lengths which are then readily cast aside.

From the foregoing explanation, it will be appreciated that the disposition of the front wheels with respect to the cutter members provides marked advantages. It will be further appreciated that the provision of the additional cutters insures efficient operation of the mower by eliminating the clogging of the operating ports by the tall cut grass.

Thus it will be seen that the construction herein shown and described is well adapted to accomplish the objects of the present invention. It will be understood, however, that the invention may be embodied otherwise than here shown and that in the embodiment illustrated, certain changes in the construction may be made. Therefore, I do not wish to be limited precisely to the construction herein shown except as may be required by the appended claims with reference to the prior art.

Having thus described the invention, what is claimed is:

1. A lawn mower comprising a frame, wheels mounted at the rear of the frame, a vertical shaft mounted on the forward end of the frame, means for rotating said shaft, a cutter member mounted at the lower end of the shaft for rotation therewith and additional cutter members carried by the shaft above the lower cutter member.

2. A lawn mower comprising a frame, a vertical shaft mounted on the frame, means for rotating said shaft, a cutter member mounted at the lower end of the shaft for rotation therewith, wheels mounted on the frame adjacent the cutter member and additional cutter members carried by the shaft above the lower cutter member.

3. A lawn mower comprising a frame, wheels mounted at the rear of the frame, a vertical shaft mounted on the forward end of the frame, means for rotating said shaft, a cutter member mounted at the lower end of the shaft for rotation therewith, wheels mounted on the forward end of the frame adjacent the cutter member and additional cutter members carried by the shaft above the lower cutter member.

4. A lawn mower comprising a frame, wheels mounted at the rear of the frame, a vertical shaft mounted on the forward end of the frame, means for rotating said shaft, a protective casing surrounding said shaft and rotatable therewith, a cutter member attached to the lower end of the casing, and a cutter member secured to the side wall of the casing above the lower cutter member.

5. A lawn mower comprising a frame, a vertical shaft mounted on the frame, means for rotating said shaft, a cutter member mounted at the lower end of the shaft for rotation therewith, said cutter extending to at least one edge of the frame and a relatively thin wheel having an outer surface substantially free of projections mounted at the aforementioned edge of the frame.

6. A lawn mower comprising a frame, vertical shafts mounted on the frame, means for rotating said shafts, cutter members mounted at the lower end of each of the shafts, said cutter members when in transverse position extending the full width of the frame, and relatively thin wheels having outer surfaces substantially free of projections mounted on the frame adjacent the cutter members.

7. A lawn mower comprising a frame, wheels mounted at the rear of the frame, a vertical shaft mounted on the forward end of the frame, means for rotating said shaft, a protective casing surrounding said shaft and rotatable therewith, cutter members mounted at the lower end of the casing, additional cutter members secured to the side wall of the casing and wheels mounted on the foreward end of the frame adjacent the cutter members.

8. A lawn mower comprising a frame, wheels mounted at the rear of the frame, a vertical shaft mounted on the forward end of the frame, means for rotating said shaft, a protective casing surrounding said shaft and rotatable therewith, cutter members mounted at the lower end of the casing and additional cutter members secured to the side wall of the casing, said latter cutter members being shorter than the first cutter members.

9. A lawn mower comprising a frame, wheels mounted at the rear of the frame, a vertical shaft mounted on the forward end of the frame, means for rotating said shaft, a protective casing surrounding said shaft and rotatable therewith, cutter members mounted at the lower end of the casing, additional cutter members secured to the side wall of the casing, said latter cutter members being shorter than the first cutter members and being arranged in different horizontal planes.

10. A lawn mower comprising a frame, vertical shafts mounted on the frame, means for rotating said shafts, protective casings surrounding said shafts, and rotatable therewith, cutter members mounted at the lower ends of each of the casings, cutter members mounted in each of the side walls of the casings, said lower cutter members extending the full width of the frame, and relatively thin wheels having outer surfaces substantially free of projections mounted on the frame adjacent the cutter members.

11. In a machine for cutting grass, a wheeled frame, vertical shafts mounted on said frame, a motor mounted on said frame for driving said shafts, a protective casing mounted on each of said shafts for rotation therewith, cutter members secured to the lower end of the casing and cutter members secured to the side wall of the casing above the first cutter members.

12. A lawn mower comprising a frame, vertical shafts mounted on the frame, means for rotating said shafts, cutter members mounted at the lower end of each of the shafts, and wheels mounted on the frame adjacent the cutter members, said wheels being tilted inwardly at their upper ends.

13. A lawn mower comprising a frame, vertical shafts mounted on the frame, means for rotating said shafts, cutter members mounted at the lower end of each of the shafts, said cutter members when in transverse position extending the full width of the frame, and relatively thin wheels mounted on the frame adjacent the cutter members, said wheels being tilted inwardly at their upper ends.

14. A lawn mower comprising a frame, vertical shafts mounted on the frame, means for rotating said shafts, protective casings surrounding said shafts and rotatable therewith, cutter members mounted at the lower end of each of the casings, cutter members mounted in each of the side walls of the casings, and relatively thin wheels mounted on the frame adjacent the cutter members, and having their upper ends tilted inwardly.

RALPH REESE POYNTER.